United States Patent [19]

Morrell

[11] Patent Number: 4,761,890

[45] Date of Patent: Aug. 9, 1988

[54] ADJUSTABLE CARPENTERS MEASURING TOOL

[75] Inventor: Michael F. Morrell, Canyon Country, Calif.

[73] Assignee: Dan Claffey, Canyon Country, Calif.; a part interest

[21] Appl. No.: 70,956

[22] Filed: Jul. 7, 1987

[51] Int. Cl.[4] ............................................. B43L 7/06
[52] U.S. Cl. ........................................ 33/473; 33/427
[58] Field of Search ................. 33/419, 473, 451, 427, 33/403, 495–500, 470, 472, 425

[56] References Cited

U.S. PATENT DOCUMENTS

| | | | |
|---|---|---|---|
| 129,737 | 7/1872 | Laughlin | 33/473 |
| 252,065 | 1/1882 | Thomas | 33/473 |
| 710,178 | 9/1902 | Budmer | 33/473 |
| 1,636,623 | 7/1927 | Cash | 33/473 |

FOREIGN PATENT DOCUMENTS 157371 12/1932 Switzerland .......................... 33/427

OTHER PUBLICATIONS

Quality Measuring Tools of John Level & Tools, Catalog No. 885-2.

Primary Examiner—Harry N. Haroian
Attorney, Agent, or Firm—Kelly, Bauersfeld & Lowry

[57] ABSTRACT

A measuring tool for use particularly in carpentry combines the features of a square, a level and a bevel tool into a single device. The measuring tool includes a clevis-like handle which supports a slide rule at one end, and a pitch slide which can be adjustably positioned within the handle for limiting pivotal movement of the slide rule with respect to the handle. The angular orientation of the slide rule can be fixed with respect to the handle when the slide rule is engaged by the pitch slide, and a carriage bolt is tightened to squeeze the slide rule between a pair of handle bracket members. Several linear and angular measurement scales are provided the slide rule, and a level vial is attached to the handle.

26 Claims, 3 Drawing Sheets

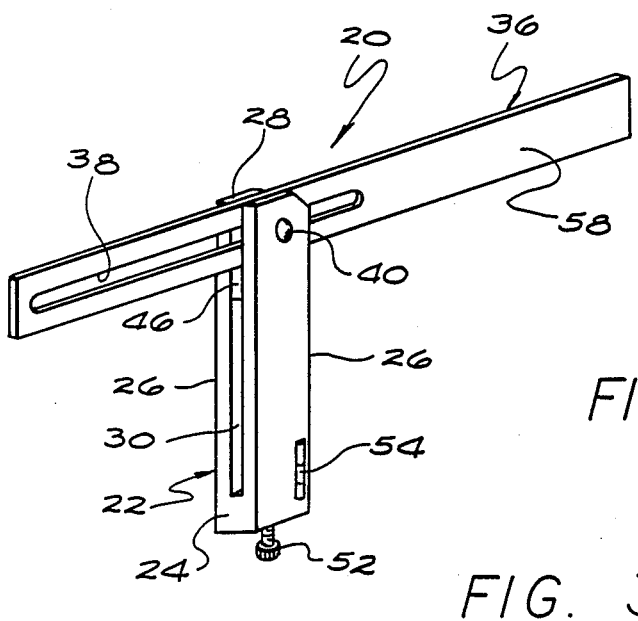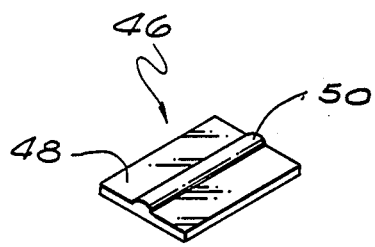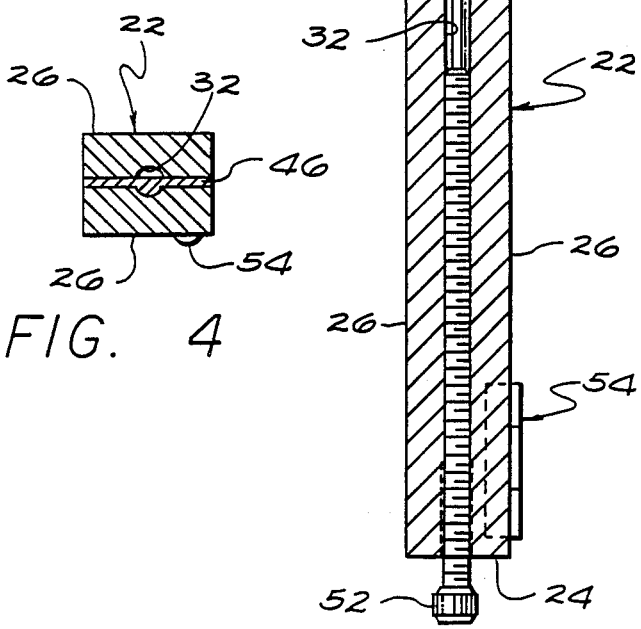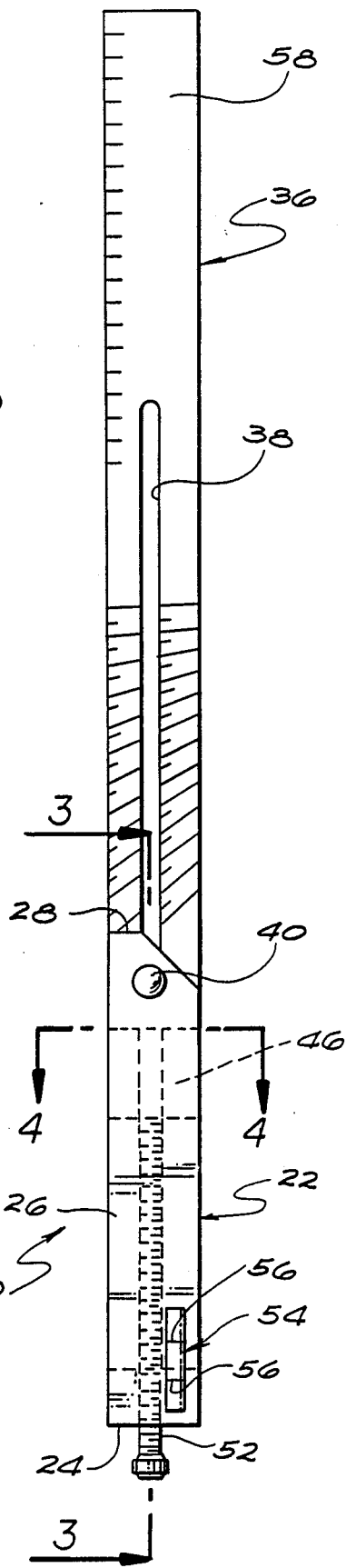

ADJUSTABLE CARPENTERS MEASURING TOOL

BACKGROUND OF THE INVENTION

This invention relates generally to hand tools. More specifically, this invention relates to a measuring tool for use particularly in carpentry which combines the features of a square, a level and a bevel tool into a single device.

A skilled carpenter often utilizes many different types of tools to quickly and economically perform his trade. Some of the more common types of tools used by carpenters include levels, tee-squares, rafter angle squares, carpenter squares, combination squares, rules, knives and gauges, as well as hammers and saws. The particular type of tool used is normally dictated by the task at hand.

Many carpenters have found it necessary to carry with them more tools than desirable as they perform their various work tasks. In some limited accessibility locations, such as encountered when building roofs, it is simply impossible for a carpenter to effectively perform his job while also carrying all of the tools he may need. This often results in wasted time and effort as the builder is forced to move from the work site to retrieve tools as the need arises.

For example, if a carpenter is on a roof during the rafter framing stage, he is typically required to cut and nail a row of freeze blocks around the perimeter of the roof. The correct manner of installing these freeze blocks would be to first snap a line on the top of the rafters after marking the points from which to snap the line from one end to another. To do this correctly and quickly, the carpenter would need a combination square. After this had been accomplished, he would then need to mark and cut the corner blocks. For this he would need a bevel or rafter square. At different points in the process, he may require the use of a level, a rule, a blueprint scale, or one of many other tools carpenters typically and routinely use.

Accordingly, there has been a need for a measuring tool which combines the features of a square, a level and a bevel tool into a single device. Such a tool must be relatively inexpensive, compact, lightweight and durable. Further, a measuring tool is needed which can square, bevel and mark angles in a simple and easy to understand manner. Moreover, such a tool is needed which can perform these tasks with a minimum of adjustment and without requiring disassembly of the tool. The present invention fulfills these needs and provides other related advantages.

SUMMARY OF THE INVENTION

The present invention resides in an improved carpentry tool which is durable and of simple construction, and which combines the utilitarian functions of a square, a level and a bevel tool into a single device. The measuring tool of this invention comprises, generally, a handle having a level attached thereto, and a slide rule positioned adjacent one end of the handle. Means are provided for attaching the slide rule to the handle in a manner permitting linear and pivotal movement of the slide rule with respect to the handle, and further means are provided for adjustably limiting the position of the slide rule with respect to the handle.

In a preferred form of the invention, the handle is clevis-like, and has a closed end and a pair of parallel bracket members which extend away from the closed end to an open end. At least one of the bracket members includes an inward channel which extends substantially the length of the bracket member. The slide rule includes a portion which is positioned between the bracket members and adjacent the open end of the handle. The slide rule includes a linear measurement rule, a blueprint scale, angular measurement scales for common rafters and hip-valley rafters, and a longitudinal closed slot.

The means for attaching the slide rule to the handle includes a shaft which extends through the bracket members near the open end of the handle and through the slide rule slot, in a manner permitting pivotal movement of the slide rule and some linear movement of the slide rule along its longitudinal axis. In this regard, a carriage bolt is typically provided which has a threaded end extending outwardly from one of the bracket members. A wing nut is threaded onto this end for purposes of squeezing the bracket members together against the slide rule and thus locking the slide rule in a desired position.

A pitch slide is further positioned between the handle bracket members, and includes a tongue which engages the inward channel of the at least one handle bracket member. This pitch slide is permitted movement between the handle closed end and the slide rule between the bracket members along a track defined by the channel. The engagement between the tongue of the pitch slide and the channel of the at least one bracket member holds the pitch slide between the bracket members.

A thumb bolt is threaded through the closed end of the handle and extends between the bracket members for adjustably engaging the pitch slide. As this thumb bolt is turned into or out of the handle, it has the effect of adjusting the position of the pitch slide relative to the slide rule. Thus, as the thumb bolt is threaded further into the handle forcing the pitch slide further toward the slide rule, the net effect is to limit the pivotal orientation of the slide rule with respect to the handle. In this manner the angular orientation of the slide rule with respect to the handle can be advantageously and incrementally adjusted by the user. When a desired angular orientation is achieved, the carriage bolt extending through the bracket members near the open end of the handle can be tightened to effectively lock the slide rule in place.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a preferred form of the adjustable carpenters measuring tool embodying the invention, and shown in a configuration wherein the handle is at a right angle to the slide rule, which is accomplished by turning the thumb bolt into the handle to immoveably position the pitch slide firmly against the longitudinal side of the slide rule;

FIG. 2 is an enlarged elevational view of the adjustable carpenters measuring tool illustrated in FIG. 1, showing the configuration of the slide rule with respect to the handle in an alternative standard configuration wherein the longitudinal axes of each are generally aligned for use of the improved tool as a level or straight edge, the pitch slide being shown in phantom as placed in a secure abutting relation with an end of the slide rule by means of the threaded thumb bolt;

FIG. 3 is a vertical sectional view taken generally along the line 3—3 of FIG. 2, illustrating in greater detail the manner in which the slide is held within the clevis-portion of the handle by means of a carriage bolt and wing nut;

FIG. 4 is an enlarged, horizontal sectional view taken generally along the line 4—4 of FIG. 2, further illustrating the positioning of the pitch slide within the clevis-portion of the handle;

FIG. 5 is a perspective view of the pitch slide;

DETAILED DESCRIPTION OF THE PREFERRED EMBODIMENT

Figure 6:
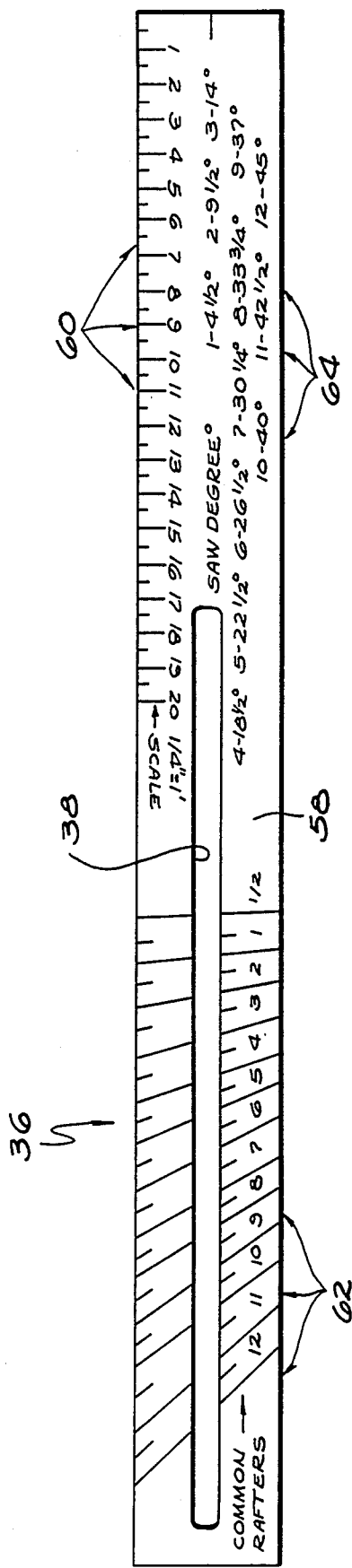
FIG. 6 is a plan view of one side of the slide rule, illustrating in particularity the various scribe and scale marking provided thereon.

As shown in the drawings for purposes of illustration, the present invention is concerned with an adjustable carpenters measuring tool, generally designated in the accompanying drawings by the reference number 20. In accordance with the present invention, and as shown best in FIGS. 1 through 7, the adjustable tool 20 is capable of squaring, beveling, and measuring angles as required in many carpentry applications without the need to disassemble the tool into specific configurations for particular applications. Further the construction of the tool 20, as described below, permits the economical manufacture of a durable product which is needed by builders of homes and other structures.

The adjustable carpenters measuring tool 20 comprises a generally rectangular, clevis-like handle 22 having a closed end 24 and a pair of parallel bracket members 26 which extend away from the closed end to an open end 28. The bracket members 26 define a gap 30, in which various other components of the measuring tool 20 are positioned. In the particular embodiment shown, each of the bracket members 26 includes a centrally positioned inward channel 32 which extends within the gap 30 substantially from the closed end 24 to aligned apertures 34 provided through the bracket members 26 near the open end 28.

A slide rule 36 is constructed of rectangular stock and includes a longitudinal closed slot 38 centered substantially along its longitudinal axis. The slide rule 36 is positioned between the bracket members 26 of the handle 22 near its upper end 28 so that the closed slot 38 is placed in general alignment with the apertures 34. To connect the slide rule 36 to the handle 22, a carriage bolt 40 extends through the aligned apertures 34 and the closed slot 38, as shown in FIG. 3. An end 42 of the carriage bolt 40 is threaded, and a wing nut 44 is placed thereon. This attachment of the slide rule 36 to the handle 22 permits pivotal movement of the slide rule and some linear movement of the slide rule along its longitudinal axis with respect to the handle. The handle 22, and particularly the bracket members 26, have sufficient flexibility so that when the wing nut 44 is tightened, the bracket members 26 will tend to squeeze the portion of the slide rule 36 positioned therebetween and hold the slide rule rigidly in a particular configuration.

A pitch slide 46 includes a rectangular body portion 48 and a ridge-like tongue 50 which extends outwardly from the body portion. The pitch slide 46 preferably has a width corresponding to the width of the bracket members 26. The pitch slide is positioned between the bracket members 26 so that the tongue 50 is positioned within an inward channel 32 of one of the bracket members 26. This slide 46 is permitted movement between the closed end 24 of the handle 22 and the slide rule 36 between the bracket members 26 along a track defined by the inward channel 32. The engagement of the tongue 50 within the channel 32 effectively holds the pitch slide 46 in place and prevents any unintended dislodgement from between the bracket members 26.

In order to position the pitch slide 46 in a desired position between the bracket members 26 when the measuring tool 20 is held in an upright position as shown in FIG. 1, a thumb bolt 52 is threaded through the closed end 24 of the handle 22. This thumb bolt 52 is caused to extend centrally upwardlly into the gap 30 for engaging the bottom end of the pitch slide 46. By simply turning the thumb bolt 32 into or out of the handle 22, the position of the pitch slide 46 within the gap 30 can be determined.

A standard level vial 54 is further attached to an exterior surface of the handle 22. This level vial 54 preferably extends parallel to the longitudinal axis of the handle 22, and includes markings 56 which help the user of the tool 20 to accurately position the handle in a horizontal plane.

Figure 7:
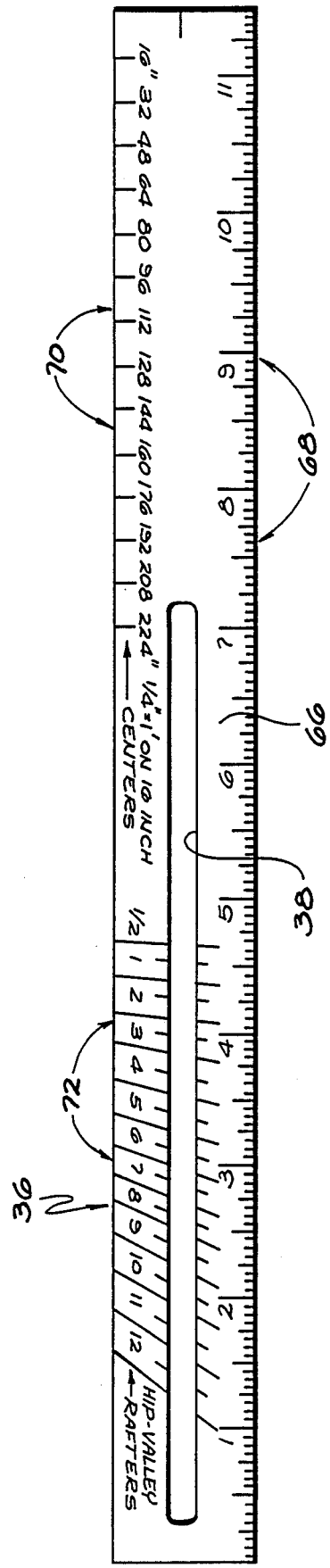
FIG. 7 is a plan view of the opposite side of the slide rule, illustrating in particularity further scribe and scale markings thereon.

Much of the utility of the measuring tool 20 is derived from the particular scribe markings placed upon the slide rule 36. In particular, and as illustrated in FIG. 6, a first side 58 of the slide rule 36 is provided a blueprint scale 60, an angular measurement scale 62 for common rafters, and a saw degree table 64 which permits the user to quickly and accurately determine the particular angular marker to use for a specific application. As shown in FIG. 7, the opposite side 66 of the slide rule 36 includes a linear measurement rule 68 along one edge thereof, a layout scale 70, and a separate angular measurement scale 72 for hip-valley rafters.

Figure 8:
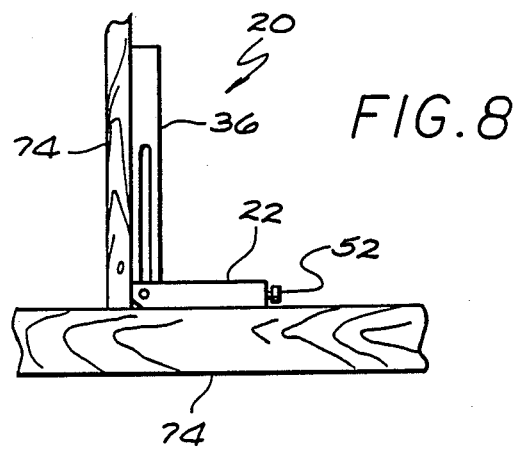
FIG. 8 is an environmental view of the adjustable carpenters measuring tool, illustrating the manner in which it can be used, among other things, as an inside corner square or vertical level.
Figure 9:
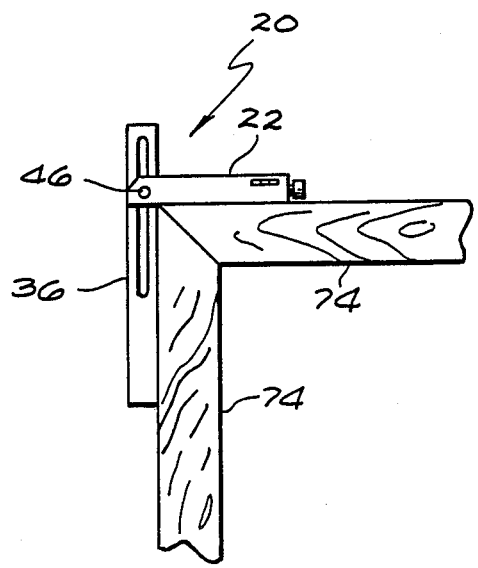
FIG. 9 is another environmental view of the adjustable carpenters measuring tool, illustrating how it can be used as an outside corner square or a horizontal level.

As illustrated in FIGS. 1 and 8 through 12, the construction of the measuring tool 20 permits the slide rule 36 to be moved freely with respect to the handle 22 in order to obtain a desired configuration of the tool. When it is desirable to place the handle 22 and the slide rule 36 at right angles to one another (as illustrated in FIGS. 1, 8, and 9), all that need be done is screw the thumb bolt 52 into the closed end 24 of the handle 22 to place the pitch slide 46 in a tight abutting relation with the slide rule 36 while it is held in a generally perpendicular relationship to the handle. Since the slide rule 36, the pitch slide 46 and the handle 22 are all rectangular, this will necessarily place the handle and the slide rule at right angles to one another.

Figure 10:
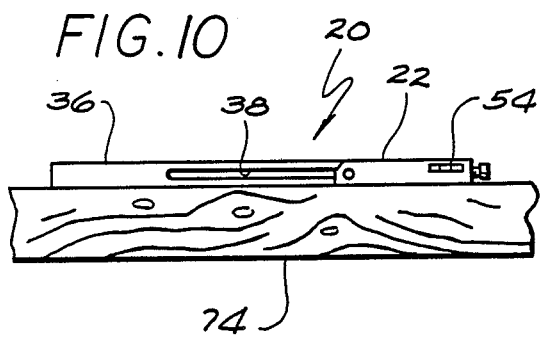
FIG. 10 is another environmental view of the adjustable carpenters measuring tool, illustrating the manner in which the configuration shown in FIG. 2 could be used as a level, rule or straight edge.
Figure 11:
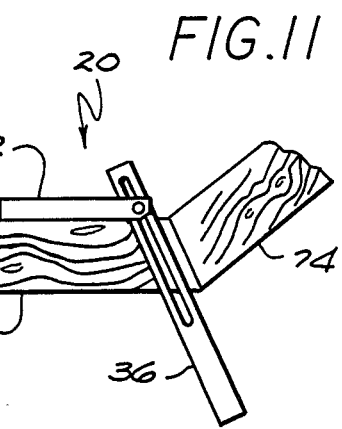
FIG. 11 is another environmental view of the adjustable carpenters measuring tool, illustrating the manner in which the angular orientation of the slide rule can be adjusted to function as a carpenter's bevel jig and for random beveling.
Figure 12:
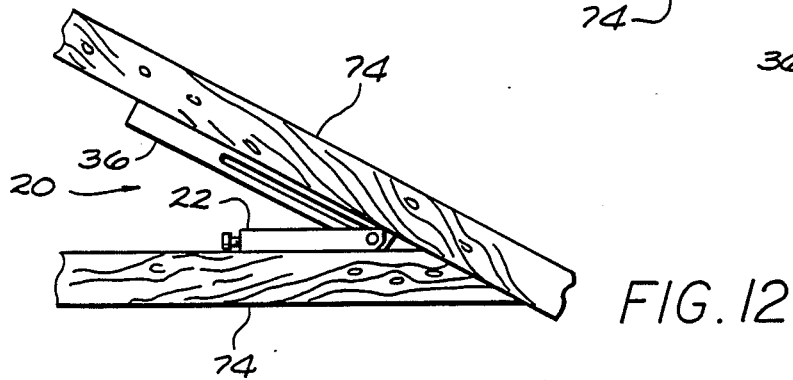
FIG. 12 is another environmental view of the adjustable carpenters measuring tool, illustrating the manner in which it can be utilized as an angle finder or a pitch level.

Alternatively, it may be desirable to align the handle 22 and the slide rule 36 along a common longitudinal axis. In this case, the pitch slide 46 would be retracted (by loosening the thumb bolt 52) from the slide rule to allow rotation of the slide rule generally into the desired aligned configuration. The thumb bolt 52 would then be tightened as described previously to place the pitch slide 46 into a secure abutting relation with an end of the slide rule 36. The resulting configuration of the measuring tool 20 would be as shown in FIGS. 2 and 10.

A common task performed by carpenters involves measuring, cutting and attaching wood beams or rafters 74 at particular angles. The measuring and marking tasks are easily accomplished when using the adjustable carpenters measuring tool 20 of the present invention, since the slide rule 36 can be quickly placed in a desired orientation with respect to the handle 22 by utilizing the angular measurement scales 62 and 72. The particular scale used will depend on the particular type of rafter. These scales 62 and 72, in connection with the saw degree table 64, permit a user to align a scribe marking of the angular measurement scale with a long edge of the handle 22, for purposes of setting-off degree variations of the slide rule 36 with respect to the handle 22 from a right angle. To hold the slide rule 36 in a desired orientation with respect to the handle 22, after the handle is aligned with a desired scribe marking the pitch slide 46 is positioned by the thumb bolt 52 to just engage the slide rule 36 and prevent any further angular movement of the slide rule toward the plane of the handle. The wing nut 44 is then tightened to squeeze the bracket members 26 about the portion of the slide rule 36 positioned therebetween. This has the effect of locking the slide rule in the desired configuration.

From the foregoing, it should be apparent that the adjustable carpenters measuring tool 20 combines the features of a square, a level, and a bevel tool into a single device. The mesuring tool 20 accomplishes this in a relatively inexpensive, compact, lightweight and durable manner. No disassembly of the tool is required to perform its various tasks, and with a minimum of adjustment a carpenter can quickly and easily measure and mark angles for many common tasks encountered on the job.

Although a particular embodiment of the invention has been described in detail for purposes of illustration, various modifications may be made without departing from the spirit and scope of the invention. Accordingly, the invention is not to be limited, except as by the appended claims.

I claim:

1. An adjustable measuring tool for use in carpentry, comprising:
   a clevis-like handle having a closed end and a pair of parallel bracket members which extend away from the closed end to an open end;
   a slide rule fastened to the handle between the bracket members and adjacent the open end, the slide rule being fastened to the handle in a manner permitting pivotal movement of the slide rule and some linear movement of the slide rule along its longitudinal axis with respect to the handle;
   a pitch slide positioned between the parallel bracket members and capable of sliding movement between the slide rule and the closed end of the handle;
   means for adjusting the position of the pitch slide in relation to the slide rule; and
   level means attached to the handle;
   wherein at least one of the bracket members of the handle has an inward channel extending between the closed end and the slide rule, and wherein the pitch slide includes a tongue which engages the inward channel and is capable of moving between the closed end of the handle and the slide rule between the bracket members along a track defined by the channel, wherein the engagement of the tongue within the channel holds the pitch slide between the bracket members.

2. An adjustable measuring tool as set forth in claim 1, wherein the slide rule includes a longitudinal closed slot through which extends a shaft anchored at both ends in the bracket members for fastening the slide rule to the handle.

3. An adjustable measuring tool as set forth in claim 2, wherein a threaded end of the shaft extends beyond the associated bracket member, and a nut is threaded thereon which can be tightened to lock the slide rule in a desired position with respect to the handle.

4. An adjustable measuring tool as set forth in claim 2, wherein the slide rule includes a linear measurement rule.

5. An adjustable measuring tool as set forth in claim 2, wherein the slide rule includes a blueprint scale.

6. An adjustable measuring tool as set forth in claim 5, wherein in the slide rule includes a layout scale.

7. An adjustable measuring tool as set forth in claim 2, wherein the slide rule includes an angular measurement scale.

8. An adjustable measuring tool as set forth in claim 7, wherein the slide rule includes an angular measurement scale for common rafters.

9. An adjustable measuring tool as set forth in claim 7, wherein the slide rule includes an angular measurement scale for hip-valley rafters.

10. An adjustable measuring tool as set forth in claim 1, wherein the means for adjusting the position of the pitch slide in relation to the slide rule includes a thumb bolt threaded through the closed end of the handle and extending between the bracket members.

11. An adjustable measuring tool for use in carpentry, comprising:
    a handle having a closed end and a pair of parallel bracket members which extend away from the closed end to an open end, wherein at least one of the bracket members includes an inward channel which extends substantially the length of the bracket member;
    a slide rule positioned adjacent one end of the handle, the slide rule including a portion which is positioned between the bracket members and adjacent the open end, an angular measurement scale, and a longitudinal closed slot;
    means for attaching the slide rule to the handle, the attaching means permitting linear and pivotal movement of the slide rule with respect to the handle;
    means for adjustably limiting the positioning of the slide rule with respect to the handle, the means for adjustably limiting the positioning of the slide rule with respect to the handle including a pitch slide positioned between the handle bracket members and having a tongue which engages the inward channel, wherein the pitch slide is permitted movement between the closed end of the handle and the slide rule between the bracket members along a track defined by the channel, wherein the engagement of the tongue within the channel holds the pitch slide between the bracket members; and level means attached to the handle.

12. An adjustable measuring tool as set forth in claim 11, wherein the slide rule includes a linear measurement scale.

13. An adjustable measuring tool as set forth in claim 12, including a thumb bolt threaded through the closed end of the handle and extending between the bracket members for adjusting the positioning of the pitch slide in relation to the slide rule.

14. An adjustable measuring tool as set forth in claim 13, wherein the means for attaching the slide rule to the handle includes a shaft which extends through the closed slot of the slide rule and which is anchored at both ends in the bracket members, wherein a threaded end of the shaft extends beyond at least one of the bracket members, and a nut is threaded thereon which can be tightened to lock the slide rule in a desired position with respect to the handle.

15. An adjustable measuring tool as for use in carpentry, comprising:

a clevis-like handle having a closed end and a pair of parallel bracket members which extend away from the closed end to an open end, at least one of the bracket members having an inward channel extending substantially the length of the bracket member;

a slide rule having a position thereof positioned between the bracket members and adjacent the open end, the slide rule including a linear measurement rule, a blueprint scale, angular measurement scales for common rafters and hip-valley rafters, and a longitudinal closed slot;

means for fastening the slide rule to the handle, the fastening means including a shaft extending through the bracket members near the open end and through the slide rule slot in a manner permitting pivotal movement of the slide rule and some linear movement of the slide rule along its longitudinal axis with respect to the handle, wherein the fastening means can be tightened to lock the slide rule in a desired position with respect to the handle;

a pitch slide positioned between the handle bracket members and having a tongue which engages the inward channel, wherein the pitch slide is permitted movement between the closed end of the handle and the slide rule between the bracket members along a track defined by the channel, wherein the engagement of the tongue within the channel holds the pitch slide between the bracket members;

a thumb bolt threaded through the closed end of the handle and extending between the bracket members for adjusting the positioning of the pitch slide in relation to the slide rule; and a level vial attached to the handle to permit accurate horizontal positioning of the handle.

16. An adjustable measuring tool for use in carpentry, comprising:

a handle having a closed end, a pair of parallel bracket members which extend away from the closed end to an open end, and track means extending between the bracket members substantially the length thereof;

a slide rule having a portion thereof positioned between the bracket members and adjacent the open end of the handle;

means for fastening the slide rule to the handle;

a pitch slide positioned between the bracket members and including guide means which engage the track means for holding the pitch between the bracket members in a manner permitting sliding movement of the pitch slide along the length of the track; and means for adjusting the position of the pitch slide between the bracket members with respect to the closed end of the handle.

17. An adjustable measuring tool as set forth in claim 16, wherein at least one of the bracket members includes an inward channel which forms the track means.

18. An adjustable measuring tool as set forth in claim 17, wherein the pitch slide includes a tongue which forms the guide means, wherein the tongue engages the inward channel.

19. An adjustable measuring tool as set forth in claim 16, wherein the slide rule is fastened to the handle in a manner permitting pivotal movement of the slide rule and some linear movement of the slide rule along its longitudinal axis with respect to the handle.

20. An adjustable measuring tool as set forth in claim 19, wherein the means for fastening the slide rule to the handle includes a shaft extending through the bracket members and the slide rule, wherein the fastening means can be tightened to lock the slide rule in a desired position with respect to the handle.

21. An adjustable measuring tool as set forth in claim 16, wherein the adjusting means includes a thumb bolt threaded through the closed end of the handle and extending between the bracket members to abut one side of the pitch slide.

22. An adjustable measuring tool as set forth in claim 16, including a level vial attached to the handle.

23. An adjustable measuring tool as set forth in claim 16, wherein the slide rule includes a linear measurement rule.

24. An adjustable measuring tool as set forth in claim 16, wherein the slide rule includes a blueprint scale.

25. An adjustable measuring tool as set forth in claim 16, wherein the slide rule includes a layout scale.

26. An adjustable measuring tool as set forth in claim 16, wherein the slide rule includes an angular measurement scale.

* * * * *